US010185558B2

(12) United States Patent
Cheng et al.

(10) Patent No.: US 10,185,558 B2
(45) Date of Patent: *Jan. 22, 2019

(54) LANGUAGE-INDEPENDENT PROGRAM COMPOSITION USING CONTAINERS (71) Applicant: International Business Machines Corporation, Armonk, NY (US)

(72) Inventors: Perry S. Cheng, Cambridge, MA (US); Stephen Fink, Yorktown Heights, NY (US); Vinod Muthusamy, Peekskill, NY (US); Rodric Rabbah, Somers, NY (US); Aleksander Slominski, Riverdale, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/859,597

(22) Filed: Dec. 31, 2017

(65) Prior Publication Data

US 2018/0121195 A1    May 3, 2018

Related U.S. Application Data (63) Continuation of application No. 15/438,444, filed on Feb. 21, 2017.

(Continued)

(51) Int. Cl.
*G06F 9/44* (2018.01)
*G06F 8/71* (2018.01)
(Continued)

(52) U.S. Cl.
CPC .................. *G06F 8/71* (2013.01); *G06F 8/31* (2013.01); *G06F 8/41* (2013.01); *G06F 9/542* (2013.01)

(58) Field of Classification Search
None
See application file for complete search history.

(56) References Cited

U.S. PATENT DOCUMENTS 8,176,469 B2 *  5/2012  Lucas ..................... G06F 9/541
                                                            717/108
8,510,728 B2 *  8/2013  Burckart ............. G06F 9/44521
                                                            717/166

(Continued)

FOREIGN PATENT DOCUMENTS

WO     WO2003036464       5/2003

OTHER PUBLICATIONS

Building Docker Images From a Container, Nickoloff, Jul. 10, 2015.*

(Continued)

*Primary Examiner* — Insun Kang
(74) *Attorney, Agent, or Firm* — Kurt Goudy; Otterstedt, Ellenbogen & Kammer, LLP (57) ABSTRACT An action sequence including a plurality of actions and a corresponding input dictionary are obtained. A first container, running an image for a first one of the actions implemented in a first programming language, is instantiated, and the image is executed on the input dictionary to obtain a first action result; the input dictionary is then updated with the first action result to obtain an updated input dictionary. A second container, running an image for a second one of the actions implemented in a second programming language, different than the first programming language, is instantiated, and the image is executed on the updated input dictionary to obtain a second action result; the updated input dictionary is further updated with the second (Continued)

action result to obtain a further updated input dictionary. The input dictionaries are independent of the programming languages.

10 Claims, 6 Drawing Sheets

Related U.S. Application Data (60) Provisional application No. 62/298,194, filed on Feb. 22, 2016, provisional application No. 62/298,093, filed on Feb. 22, 2016.

(51) Int. Cl.
  *G06F 9/54* (2006.01)
  *G06F 8/41* (2018.01)
  *G06F 8/30* (2018.01)

(56) References Cited

U.S. PATENT DOCUMENTS

| | | | |
|---|---|---|---|
| 9,916,137 B2* | 3/2018 | Chouhan | G06F 8/31 |
| 9,928,108 B1* | 3/2018 | Wagner | G06F 9/466 |
| 2006/0041871 A1* | 2/2006 | Friedman | G06F 17/30038 |
| | | | 717/136 |
| 2008/0295070 A1* | 11/2008 | Bozza | G06F 8/51 |
| | | | 717/106 |
| 2009/0157627 A1 | 6/2009 | Arthursson | |
| 2009/0177700 A1* | 7/2009 | Grim, III | G06F 17/30026 |
| 2010/0088669 A1* | 4/2010 | Cwalina | G06F 8/73 |
| | | | 717/106 |
| 2012/0113264 A1 | 5/2012 | Moshrefi et al. | |
| 2013/0018955 A1* | 1/2013 | Thaxton | G06F 17/3089 |
| | | | 709/204 |
| 2013/0254314 A1 | 9/2013 | Chow | |
| 2014/0053150 A1* | 2/2014 | Barnett | G06F 9/455 |
| | | | 718/1 |
| 2014/0068549 A1* | 3/2014 | Friedman | G06F 8/30 |
| | | | 717/104 |
| 2014/0344112 A1* | 11/2014 | Smedberg | G06F 17/2235 |
| | | | 705/26.41 |
| 2015/0128105 A1* | 5/2015 | Sethi | G06F 8/36 |
| | | | 717/106 |
| 2015/0135167 A1* | 5/2015 | Berk | G06F 11/3636 |
| | | | 717/128 |
| 2015/0143260 A1 | 5/2015 | Bailey et al. | |
| 2016/0124731 A1* | 5/2016 | Hill, III | G06F 8/47 |
| | | | 717/137 |
| 2017/0242689 A1 | 8/2017 | Cheng et al. | |
| 2017/0242737 A1 | 8/2017 | Fink et al. | |
| 2017/0337054 A1* | 11/2017 | Parees | G06F 8/60 |
| 2018/0039412 A1* | 2/2018 | Singh | G06F 3/0665 |
| 2018/0039506 A1* | 2/2018 | Wagner | G06F 9/44552 |

OTHER PUBLICATIONS

BluemixBluemix Launches IBM Containers Beta Based on Docker, McGee, Dec. 4, 2014.*
Best practices for writing Dockerfiles, docker.com, cached Feb. 12, 2015.*
GitHub. Downloaded from https://en.wikipedia.org/wiki/GitHub on Nov. 17, 2016. pp. 1-6.
Gero Muhl et al., Distributed Event-Based Systems. Springer-Verlag Berlin Heidelberg 2006, pp. I-XIX and 1-384.
Peter Mell & Timothy Grance, The NIST Definition of Cloud Computing. Special Publication 800-145, Sep. 2011. cover, pp. i-iii and 1-3.
Anonymous, IBM OpenWhisk Cloudfirst distributed event-based programming service High Level Architecture, downloaded Nov. 25, 2016 from https://developer.ibm.com/openwhisk/, pp. 1-4.
Stratos Dimopoulos, Thrift Tutorial Release 1.0, Jan. 31, 2016, pp. i-11, 1-49.
Mark Slee et al., Thrift: Scalable Cross-Language Services Implementation, Facebook, Apr. 1, 2007, pp. 1-8.
Hablog, λm.xyz, My Take on Functional Programming, Jan. 9, 2014, pp. 1-4.
Anon., What Is Docker?, pp. 1-4, downloaded from https://www.docker.com/what-docker Feb. 8, 2017.
Wikipedia,Web server, downloaded Feb. 8, 2017 from https://en.wikipedia.org/wiki/Web_server pp. 1-5.
Wikipedia,Docker (software), downloaded Jan. 11, 2016 from https://en.wikipedia.org/wiki/Docker_(software) pp. 1-6.
Paul J. Ottterstedt, List of IBM Patents or Patent Applications Treated as Related, pp. 1-2, Jul. 24, 2018.

* cited by examiner

LANGUAGE-INDEPENDENT PROGRAM COMPOSITION USING CONTAINERS

CROSS-REFERENCE TO RELATED APPLICATIONS

This application claims the benefit of U.S. Provisional Patent Application 62/298,093, filed 22 Feb. 2016, entitled Language-Independent Program Composition using Containers, and also claims the benefit of U.S. Provisional Patent Application 62/298,194, filed 22 Feb. 2016, entitled Managing External Feeds in an Event-Based Computing System. The complete disclosures of U.S. Provisional Patent Application 62/298,093 and U.S. Provisional Patent Application 62/298,194 including all appendices of both are expressly incorporated by reference herein in their entireties for all purposes. In addition, this application is a continuation of U.S. patent application Ser. No. 15/438,444 filed Feb. 21, 2017, the complete disclosure of which is expressly incorporated herein by reference in its entirety for all purposes.

BACKGROUND

The present invention relates to the electrical, electronic and computer arts, and, more particularly, to cloud programming models, runtimes and integration, including, for example, application and integration middleware and the like.

Composition is a pertinent construct in modern programming languages. Briefly, given two functions f and g, a programming composition construct gives the programmer a mechanism to define a new function h as h(x)=f(g(x)).

Most modern programming languages provide high-level constructs to compose functions. JAVA, SCALA, JAVASCRIPT, ML, LISP, PYTHON, RUBY, and other languages all support composition constructs as core language primitives.

Each such language has its own unique implementation, typically including some combination of a compiler, interpreter, and/or run-time system. All of these languages provide some sort of Foreign Function Interface (FFI), whereby one language can call to another through a low-level application programming interface (API).

SUMMARY

Principles of the invention provide techniques for language-independent program composition using containers. In one aspect, an exemplary method includes obtaining an action sequence including a plurality of actions; and a corresponding input dictionary; instantiating a first container running an image for a first one of the actions implemented in a first programming language; executing the image for the first one of the actions on the input dictionary to obtain a first action result; and updating the input dictionary with the first action result to obtain an updated input dictionary. Further steps include instantiating a second container running an image for a second one of the actions implemented in a second programming language different than the first programming language; executing the image for the second one of the actions on the updated input dictionary to obtain a second action result; and updating the updated input dictionary with the second action result to obtain a further updated input dictionary. The input dictionary, the updated input dictionary, and the further updated input dictionary are independent of the first and second programming languages.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments:

implement high-level composition primitives that cross different programming languages; and/or implement high-level platform-as-a-service constructs to facilitate productive development of cloud computing applications.

These and other features and advantages of the present invention will become apparent from the following detailed description of illustrative embodiments thereof, which is to be read in connection with the accompanying drawings.

DETAILED DESCRIPTION

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 1:
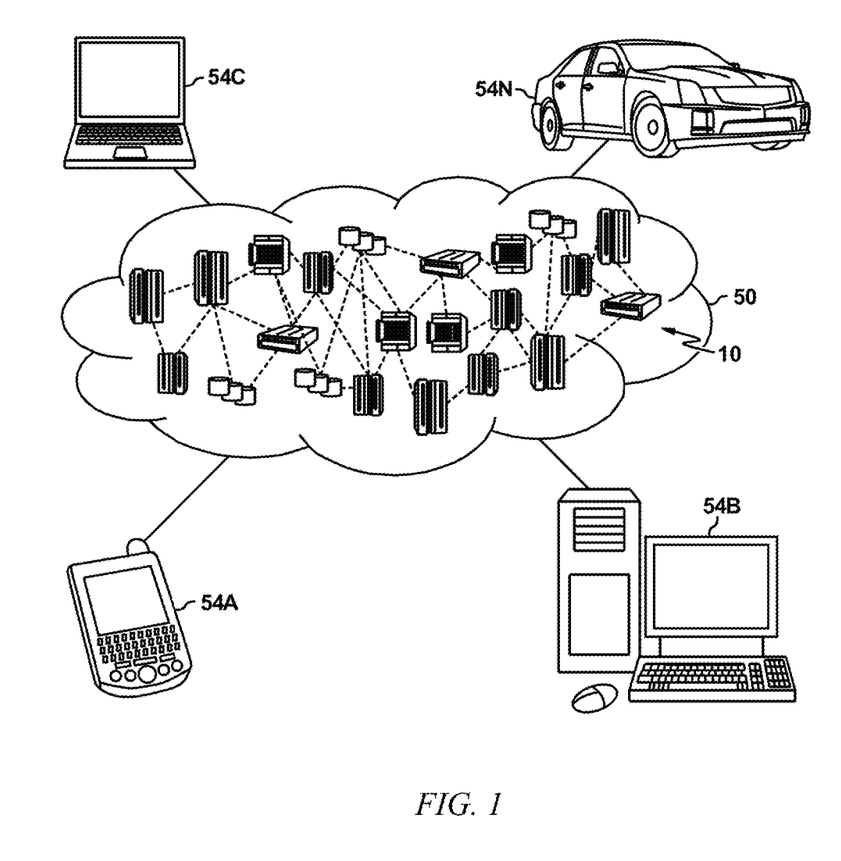
FIG. 1 depicts a cloud computing environment according to an embodiment of the present invention.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
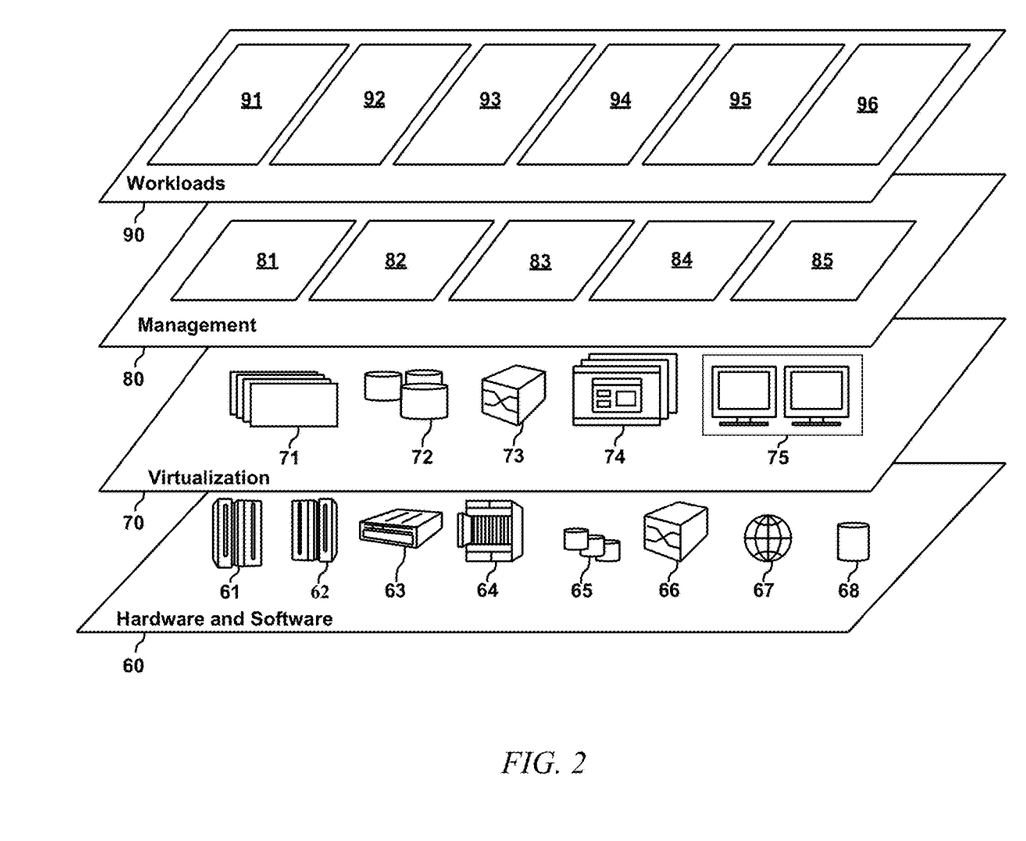
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and software elements of a system for language-independent program composition using containers, labeled 96, according to an aspect of the invention.

As noted, composition is a pertinent construct in modern programming languages. Briefly, given two functions f and g, a programming composition construct gives the programmer a mechanism to define a new function h as $h(x)=f(g(x))$. Most modern programming languages provide high-level constructs to compose functions. JAVA, SCALA, JAVASCRIPT, ML, LISP, PYTHON, RUBY, and other languages all support composition constructs as core language primitives. Each such language has its own unique implementation, typically including some combination of a compiler, interpreter, and/or run-time system. All of these languages provide some sort of Foreign Function Interface (FFI), whereby one language can call to another through a low level application programming interface (API).

One or more embodiments advantageously implement high-level composition primitives that cross different programming languages. As used herein, a high-level composition primitive is one that allows the programmer to declare a composition with a simple, concise statement in a programming language. Furthermore, the high-level composed construct can then be manipulated as a first-class programming object, and combined into larger compositions. In contrast, low-level programming solutions do not provide language mechanisms to express compositions as first-class objects; rather, the programmer indirectly effects compositions with side effects from imperative statements and procedure calls.

One or more embodiments provide a way to specify and implement program composition where the functions being composed can be implemented in any programming language. One or more embodiments utilize lightweight operating system containers and a standard protocol to reify function abstractions, resulting in a set of artifacts that a general runtime system can manage efficiently to implement cross-language composition.

One or more embodiments use two standard mechanisms prevalent in modern computer systems:

(1) Lightweight containers, such as popularized by DOCKER, and (2) A web server—a software component that runs continuously, listens for connections, and handles requests based on a protocol such as HTTP.

The skilled artisan will appreciate that DOCKER is an open source project that automates the deployment of applications inside software containers, by providing an additional layer of abstraction and automation of operating system level virtualization on LINUX. DOCKER uses the resource isolation features of the LINUX kernel such as cgroups and kernel namespaces, and a union-capable file system such as aufs and others to allow independent "containers" to run within a single LINUX instance, avoiding the overhead of starting and maintaining virtual machines. As used herein, "containers" package an application into a standardized unit for software development, essentially wrapping a piece of software in a complete filesystem that contains everything needed to run: code, runtime, system tools, system libraries—anything that can be installed on a server. This guarantees that the software will always run the same, regardless of its environment. Such containers are said to be lightweight because containers running on a single machine share the same operating system kernel; they start instantly and use less RAM. Images are constructed from layered filesystems and share common files, making disk usage and image downloads efficient.

The skilled artisan will appreciate that a web server is a computer system that processes requests via HTTP, the basic network protocol used to distribute information on the World Wide Web. The term can refer to the entire system, or specifically to the software that accepts and supervises the HTTP requests. The web server 304 in FIG. 3 is a particular piece of software running inside a container in one or more embodiments of the invention.

In the text that follows, the term "action" is used to mean a function implementation suitable for management by one or more embodiments.

Figure 3:
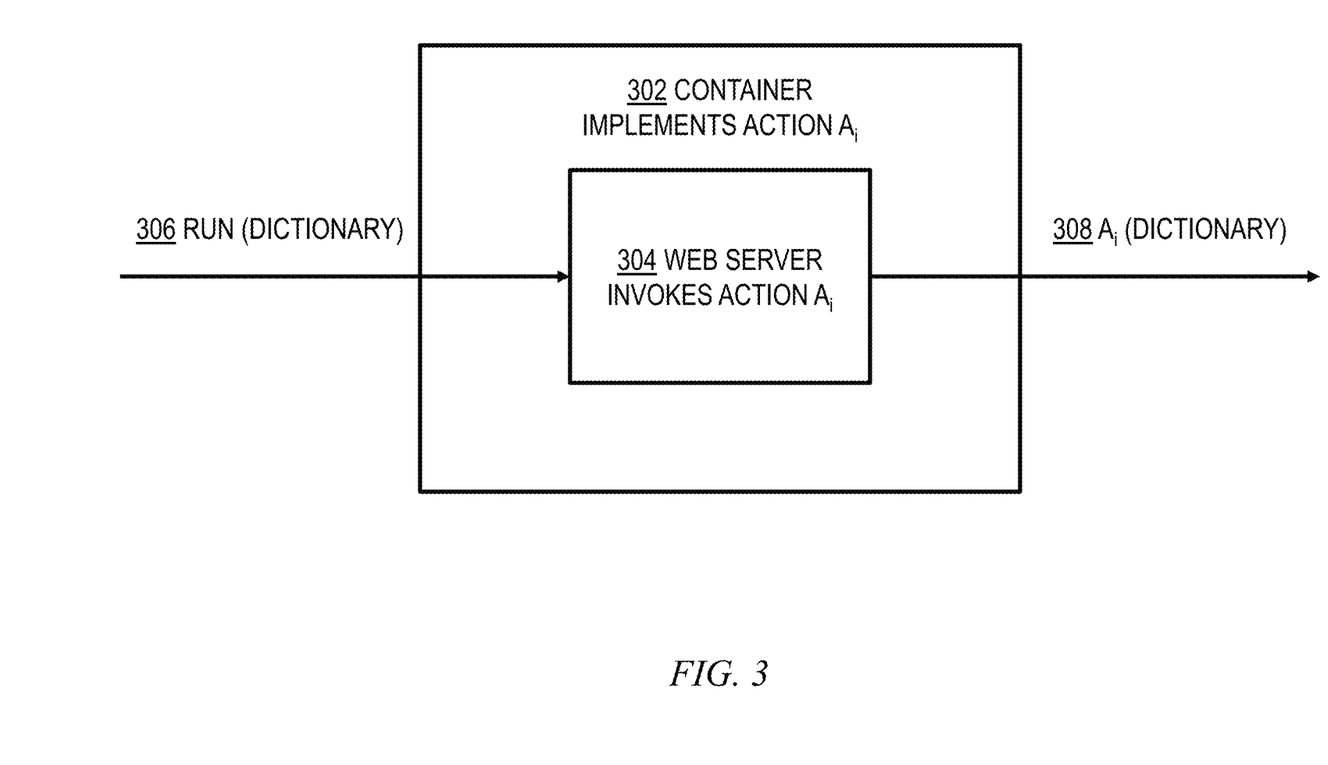
FIG. 3 is a block diagram of a container implementing an action via a web server according to an embodiment of the present invention.

Implementation of a Single Action referring to FIG. 3, in one or more embodiments, an action is implemented by a container 302 that runs a web server 304. The web server 304 is configured to accept a request called a "run" request, as seen at 306, intended to mean "invoke the action". In HTTP, a "run" request could be implemented by an HTTP POST to a "/run" URI route.

The "run" request takes a set of "parameters," which is a textual or binary representation of a set of keys and values (usually called a dictionary). In today's web, a JSON object is the standard implementation of a dictionary understood by most REST APIs.

The container implementing the action "$A_i$" hosts a function "f" implemented in some programming language. Assume that there is some natural mapping of a dictionary to the parameters to the function f. For example, JAVASCRIPT functions can accept a JAVASCRIPT object. A JAVA function could accept a Map from Strings to Strings.

The web server 304 for "$A_i$" is configured to invoke "f" with the input parameters (e.g. dictionary passed with the run request), with whatever mechanism is appropriate for the language of f. As seen at 308, the output is the value of $A_i$ based on the input parameters (dictionary).

Purely by way of example and not limitation, consider two scenarios of how this could be implemented.

In a first example, there are cases where the web server can be configured to invoke function f directly. For example, a node.js web server can invoke a JAVASCRIPT function directly. A JAVA web server can implement a JAVA function directly.

In a second example, the web server can also support functions implemented as arbitrary binaries. Suppose the container contains an arbitrary binary program which accepts input and produces output. A web server can be configured to execute the binary with input corresponding to the input dictionary, and capture the output. In this way, the invention can support functions coded in any language or toolchain that can be compiled to a program binary or callable script.

Implementation of Action Composition

Consider now a non-limiting example of how one or more embodiments can specify and implement action composition based on the action implementation with containers, just described.

First, it is appropriate to have a format to name and specify an action. One or more embodiments use a data structure for an action which contains at least two pieces of information: the action name, and the name or specifier of the container image that implements the action. For an action $a_1$ let A_1.name be its name and A_1.image be the container image.

Next, it is appropriate to have a data structure to describe an action sequence. This can, for example, simply be a list of actions.

Figure 4:
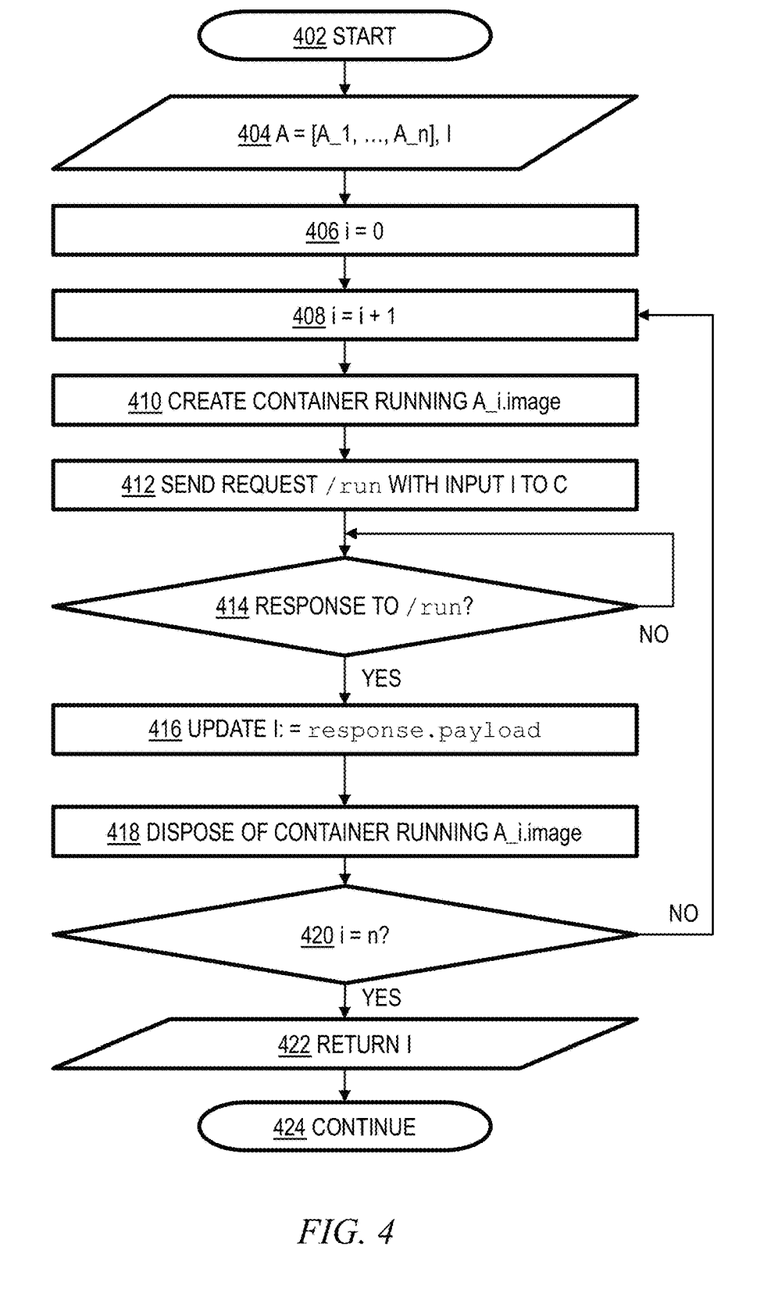
FIG. 4 is a flow chart of a first method of program composition, according to an aspect of the invention.

Consider the runtime mechanism to execute an action sequence on a given input dictionary. Given an action sequence A=[A_1, A_2, . . . , A_n] and an input dictionary I:

```
Input: A = [A_1, ..., A_n], I
for i = 1 to n do
    Create a container C running A_i.image.
    Send the request/run with input I to C.
    Wait for a response to the/run request.
    Update I := response.payload
    Dispose of container C.
done
return I
```

The pseudo-code in the above paragraphs is shown generally in the flow chart of FIG. 4. Processing begins at 402. In step 404, input the action sequence (i.e. for the program composition) and the input dictionary I. Certain steps are to be carried out for i=1 to n; this is illustrated in FIG. 4 by initializing the counter i to zero in step 406 and incrementing it by one in step 408. In step 410, create a container C running A_i.image. In step 412, send the request /run, with input I, to the container ("C"). In decision block 414, wait for a response to the /run request; if no response ("NO" branch) loop back and check again; if a response is received ("YES" branch), PROCEED TO STEP 416 and update the value of I to response.payload (i.e., value of the function $A_i$). Then, in step 418, dispose of the container running the A_i.image. In decision block 420, check to see if i has reached n; if not ("NO" branch) loop back to step 408 and increment i. If i has reached n ("YES" branch), return the final value of I (output of the composite program) in step 422. Processing continues at 424.

Consider a second embodiment which reuses containers, to avoid the overhead of creating and disposing of containers repeatedly. Rather than creating a container in each step, assume a container pool which maintains a cache of containers 302 already running for some set of actions. The container pool may allocate or dispose of containers based on some policy, designed to manage finite resources.

Assume the container pool provides a function findOrCreateContainer(image), which returns a pre-allocated container for an image if one exists and is available, or creates a new one if no pre-allocated container is available.

Figure 5:
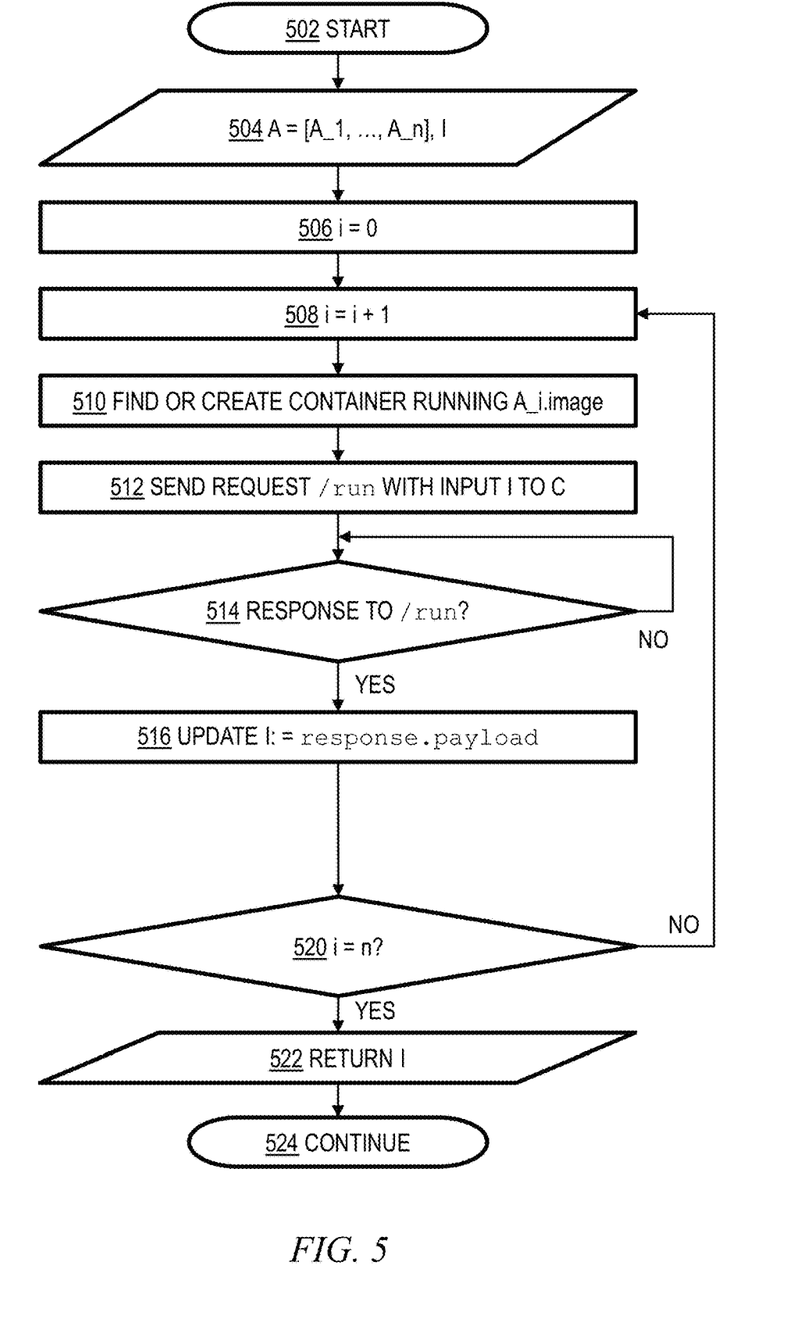
FIG. 5 is a flow chart of a second method of program composition, according to an aspect of the invention.

```
Input: A = [A_1, ..., A_n], I
for i = 1 to n do
    findOrCreate container C for A_i.image.
    Send the request/run with input I to C.
    Wait for a response to the/run request.
    Update I := response.payload
done
return I
```

The pseudo-code in the above paragraphs is shown generally in the flow chart of FIG. 5. Processing begins at 502. In step 504, input the action sequence (i.e. for the program composition) and the input dictionary I. Certain steps are to be carried out for i =1 to n; this is illustrated in FIG. 5 by initializing the counter i to zero in step 506 and incrementing it by one in step 508. In step 510, find or create a container C running A_i.image. In step 512, send the request /run, with input I, to the container ("C"). In decision block 514, wait for a response to the /run request; if no response ("NO" branch) loop back and check again; if a response is received ("YES" branch), proceed to step 516 and update the value of I to response.payload (i.e., value of the function $A_i$). In decision block 520, check to see if i has reached n; if not ("NO" branch) loop back to step 508 and increment i. If i has reached n ("YES" branch), return the final value of I (output of the composite program) in step 522. Processing continues at 524.

The OPENWHISK serverless event-based programming service is of interest in one or more embodiments. Reference is made to the OPENWHISK project, which contains the source code behind IBM BLUEMIX OPENWHISK. OPENWHISK provides a cloud-native event-based programming system where event handlers are called actions. "Serverless" is defined herein as referring to a cloud-native platform for short-running, stateless computation and event-driven applications which scales up and down instantly and automatically and charges for actual usage at a fine (e.g., millisecond) granularity.

One or more embodiments advantageously provide one, some, or all of the following:

capable of open source implementation
provide rich eco-system of services acting as event producers/consumers
supports third-party services as event producers
provides techniques to enable third-party services as event procedures
many supported runtimes; e.g., NodeJS
can run on any cloud platform
can run dedicated
can run on-premises
supports long-running actions
supports triggering scheduled actions
supports integrating services via standards such as web hooks
provides shareable and reusable community-managed recipes using AppStitch or the like
provides visual tooling for development and debugging
provides CLI and/or monitoring tools Some embodiments use Cloud Foundry BOSH, an open source tool chain for release engineering, deployment and lifecycle management of large scale distributed services.

Some aspects are directed to an exemplary method for program composition in a cloud platform architecture including the steps of identifying a first program having a first programming language, the first program running in a first container; generating, on a cloud platform, a first output from the first container responsive to running the first program; identifying, on the cloud platform, a second program having a second programming language, the second program running in a second container; receiving, at the second container on the cloud platform, the first output from the first container; and generating a second output from the second container responsive to running the second program based on the second program receiving the first output from the second container. The first and the second output associated with the first and the second container include dictionary values that are independent of the first and the second programming language.

Given the discussion thus far, it will be appreciated that, in general terms, an exemplary method, according to an aspect of the invention, includes (see steps 404 and 504) obtaining an action sequence including a plurality of actions $A_i$ and a corresponding input dictionary I. A further step 410, 510 includes instantiating a first container 302 running an image for a first one of the actions (say, A_1) implemented in a first programming language. A still further step 412, 414, 512, 514 includes executing the image for the first one of the actions on the input dictionary (e.g. responsive to command 306) to obtain a first action result. Still a further step 416, 516 includes updating the input dictionary with the first action result to obtain an updated input dictionary (e.g. 308). Another step (repeated steps 410, 510) includes instantiating a second container 302 running an image for a second one of the actions (say A_2) implemented in a second programming language different than the first programming language. For the avoidance of doubt, while ultimately all programming languages are eventually translated down to machine language by a compiler or toolchain, the first and second programming languages as used herein are at a higher level than machine language and are different from each other (e.g., C++ and PERL). Still another step (repeated steps 412, 414, 512, 514) includes executing the image for the second one of the actions on the updated input dictionary (e.g. responsive to command 306) to obtain a second action result. Even another step (repeated steps 416, 516) includes updating the updated input dictionary with the second action result to obtain a further updated input dictionary (e.g. 308). The input dictionary, the updated input dictionary, and the further updated input dictionary are independent of the first and second programming languages. That is to say, in one or more embodiments, the format of the dictionary is independent of the programming language in which the actions are defined.

In some cases (e.g., n=2), the further updated input dictionary is output of a composite program formed from the first and second ones of the actions. In other cases (e.g. n>2), the further updated input dictionary is an intermediate result for a composite program formed from the first and second ones of the actions, and at least one additional action.

In some cases, the first container 302 runs the image for the first one of the actions by running a web server 304 that invokes the first one of the actions and the second container 302 runs the image for the second one of the actions by running a web server 304 that invokes the second one of the actions.

The web servers that invoke the first and second ones of the actions may invokes them directly in some instances; in other cases, the web servers that invoke the first and second ones of the actions each support arbitrary binaries.

In a non-limiting example, the first programming language is compiled and the second programming language is interpreted.

In cases where instantiating the containers involves creation, additional steps can include disposing of the first container subsequent to updating the input dictionary with the first action result; and disposing of the second container subsequent to updating the updated input dictionary with the second action result. On the other hand, in some cases instantiating the containers includes finding one or more of them in a preexisting pool.

In one or more embodiments, the first and second containers run without restarting virtual machines; optionally, within a single operating system (e.g., LINUX) instance without starting and maintaining virtual machines. Note, however, that in a distributed system, the actions may be (likely will be) distributed across machines and so may be on multiple OS (e.g., LINUX) instances.

Furthermore, given the discussion thus far, it will be appreciated that, in general terms, an exemplary non-transitory computer readable medium includes computer executable instructions which when executed by a computer cause the computer to perform a method for program composition in a cloud platform architecture, as set forth above.

Yet further, given the discussion thus far, it will be appreciated that, in general terms, an exemplary system includes a memory; at least one processor, coupled to the memory; and a non-transitory computer readable medium comprising computer executable instructions which when loaded into the memory configure the at least one processor to be operative to perform a method for program composition in a cloud platform architecture, as set forth above.

Figure 6:
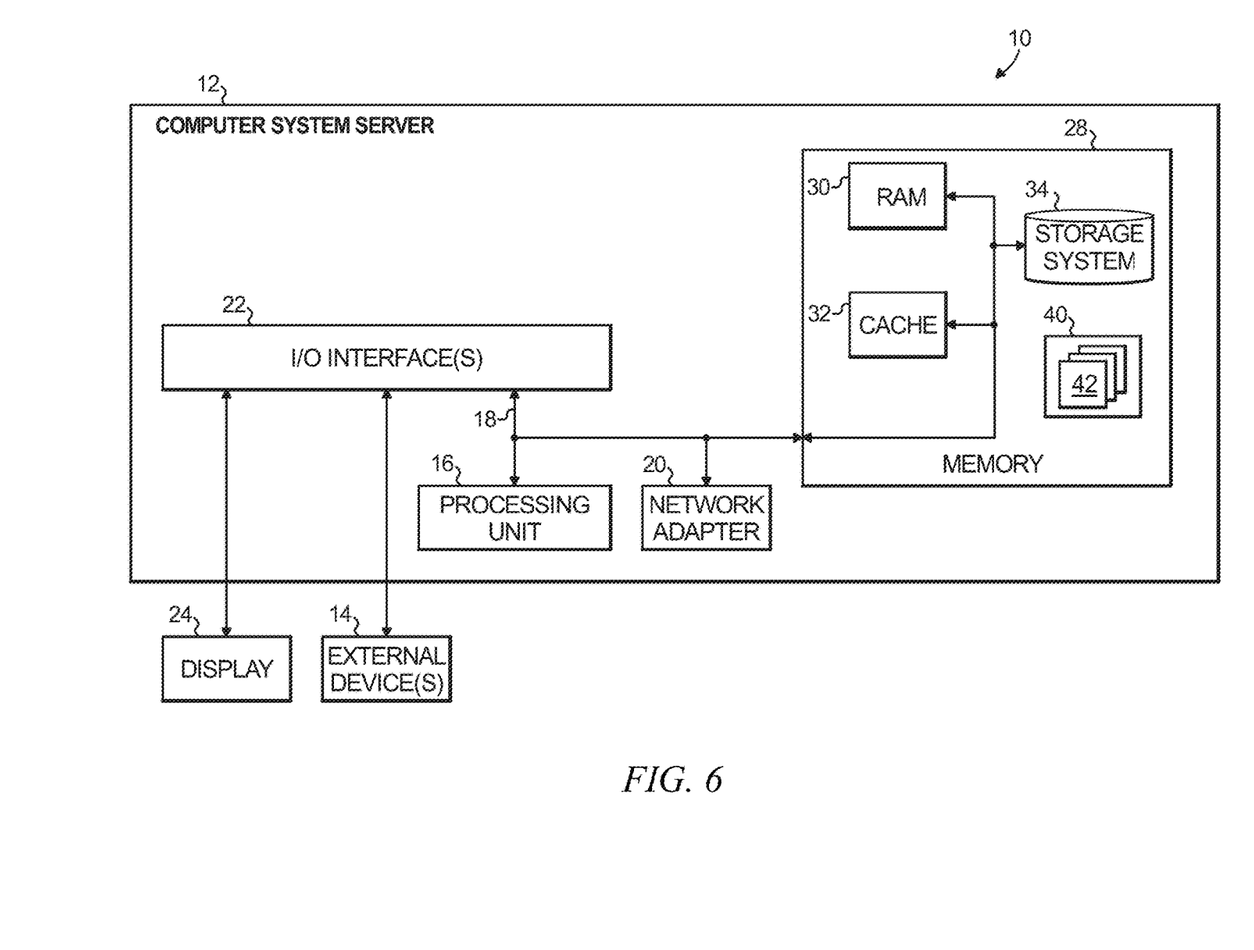
FIG. 6 depicts a computer system that may be useful in implementing one or more aspects and/or elements of the invention, also representative of a cloud computing node according to an embodiment of the present invention.

One or more embodiments of the invention, or elements thereof, can be implemented in the form of an apparatus including a memory and at least one processor that is coupled to the memory and operative to perform exemplary method steps. FIG. 6 depicts a computer system that may be useful in implementing one or more aspects and/or elements of the invention, also representative of a cloud computing node according to an embodiment of the present invention. Referring now to FIG. 6, cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 6, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 6) running a server program. It will be understood that such a physical server may or may not include a display and keyboard. Note that while FIG. 6 is representative of a server, it is also representative of a variety of other computer systems. For the avoidance of doubt, as noted above, the skilled artisan will appreciate that a web server is a computer system that processes requests via HTTP, the basic network protocol used to distribute information on the World Wide Web. The term can refer to the entire system, or specifically to the software that accepts and supervises the HTTP requests. The web server 304 in FIG. 3 is a particular piece of software running inside a container in one or more embodiments of the invention, but execution is ultimately still on a physical machine.

One or more embodiments can be at least partially implemented in the context of a cloud or virtual machine environment, although this is exemplary and non-limiting. Reference is made back to FIGS. 1-2 and accompanying text. Consider, e.g., a cloud computing environment with layers as in FIG. 2 wherein software components such as those shown in FIG. 3 reside as a workload 96 in layer 90.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described (e.g., in FIG. 3 and/or to implement logic in FIGS. 4 and 5, 5, and 6). The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

One example of user interface that could be employed in some cases is hypertext markup language (HTML) code served out by a server or the like, to a browser of a computing device of a user. The HTML is parsed by the browser on the user's computing device to create a graphical user interface (GUI). Other types of user interface can be employed. Some embodiments could employ a command line interface.

Exemplary System and Article of Manufacture Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    obtaining:
    an action sequence comprising a plurality of actions; and
    a corresponding input dictionary;
    instantiating a first container running a first image for a first one of said actions implemented in a first programming language;
    executing said first image for said first one of said actions on said input dictionary to obtain a first action result;
    updating said input dictionary with said first action result to obtain an updated input dictionary;
    instantiating a second container running a second image for a second one of said actions implemented in a second programming language different than said first programming language;
    executing said second image for said second one of said actions on said updated input dictionary to obtain a second action result; and
    updating said updated input dictionary with said second action result to obtain a further updated input dictionary;
    wherein said input dictionary, said updated input dictionary, and said further updated input dictionary are independent of said first and second programming languages.

2. The method of claim 1, wherein said further updated input dictionary comprises output of a composite program formed from said first and second ones of said actions.

3. The method of claim 1, wherein said further updated input dictionary comprises an intermediate result for a composite program formed from said first and second ones of said actions, and at least one additional action.

4. The method of claim 1, wherein said first container runs said first image for said first one of said actions by running a web server that invokes said first one of said actions and wherein said second container runs said second image for said second one of said actions by running a web server that invokes said second one of said actions.

5. The method of claim 4, wherein said web server that invokes said first one of said actions invokes said first one of said actions directly and wherein said web server that invokes said second one of said actions invokes said second one of said actions directly.

6. The method of claim 4, wherein said web server that invokes said first one of said actions and said web server that invokes said second one of said actions each support arbitrary binaries.

7. The method of claim 1, wherein said first programming language is compiled and said second programming language is interpreted.

8. The method of claim 1, wherein said instantiation of said first and second containers comprises creating said first and second containers, further comprising:
    disposing of said first container subsequent to updating said input dictionary with said first action result; and
    disposing of said second container subsequent to updating said updated input dictionary with said second action result.

9. The method of claim 1, wherein said instantiation of said first and second containers comprises finding at least one of said first and second containers in a preexisting pool.

10. The method of claim 1, wherein said first and second containers run without restarting virtual machines.

* * * * *